United States Patent
Hoernkvist (10) Patent No.: US 7,730,070 B2
(45) Date of Patent: Jun. 1, 2010

(54) INDEX AGING AND MERGING

(75) Inventor: John Martin Hoernkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 11/760,773

(22) Filed: Jun. 10, 2007

(65) Prior Publication Data

US 2008/0306978 A1    Dec. 11, 2008

(51) Int. Cl.
*G06F 17/30* (2006.01)
(52) U.S. Cl. ................... 707/741; 707/711; 707/715
(58) Field of Classification Search .......... 707/705–789
See application file for complete search history.

(56) References Cited

U.S. PATENT DOCUMENTS 6,169,983 B1 *   1/2001   Chaudhuri et al. ............. 707/2
2004/0267722 A1 * 12/2004   Larimore et al. ............... 707/3

* cited by examiner

*Primary Examiner*—Isaac M Woo
(74) *Attorney, Agent, or Firm*—Blakely, Sokoloff, Taylor & Zafman LLP (57) ABSTRACT

Systems and methods for processing an index are described. An index may be merged with another index of comparable age and size into a single index. Since older indexes are less likely to need updating, they are "set aside" to age based on certain adaptive criteria such as the age and size of the index, percentage of deletions, and how long it takes to update the index. An index that has been set aside may be compacted into a format that is optimized for fast searching.

10 Claims, 6 Drawing Sheets

INDEX AGING AND MERGING

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears. Given the large numbers of words and documents in which the words may appear, an inverted index can be extremely large. The size of an index presents many challenges in processing and storing the index, such as updating the index or using the index to perform a search.

SUMMARY OF THE DETAILED DESCRIPTION

Methods and systems for processing an inverted index in a data processing system are described herein.

According to one aspect of the invention, a method for aging an index is described in which an index is set aside to age when the index meets certain aging criteria. The aging criteria may include, among others, the size of the index, the deletion rate, the amount of processor time required to update the index from an update set and/or the size of the update sets used to update the index. The criteria may be adapted to the current computing environment, such as the amount of memory that is currently available. Once an index is set aside it is generally closed to further updates other than deletions.

According to one aspect of the invention, the method for merging an index is described in which two or more indexes are merged into one index when the two or more indexes meet certain merging criteria. The merging criteria may include, among others, the comparative sizes and ages of the indexes. The criteria may be adapted to the current computing environment, such as the amount of memory that is currently available.

BRIEF DESCRIPTION OF THE DRAWINGS

The present invention is illustrated by way of example and not limitation in the figures of the accompanying drawings in which like references indicate similar elements.

DETAILED DESCRIPTION

The embodiments of the present invention will be described with reference to numerous details set forth below, and the accompanying drawings will illustrate the described embodiments. As such, the following description and drawings are illustrative of embodiments of the present invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2007.

Figure 1:
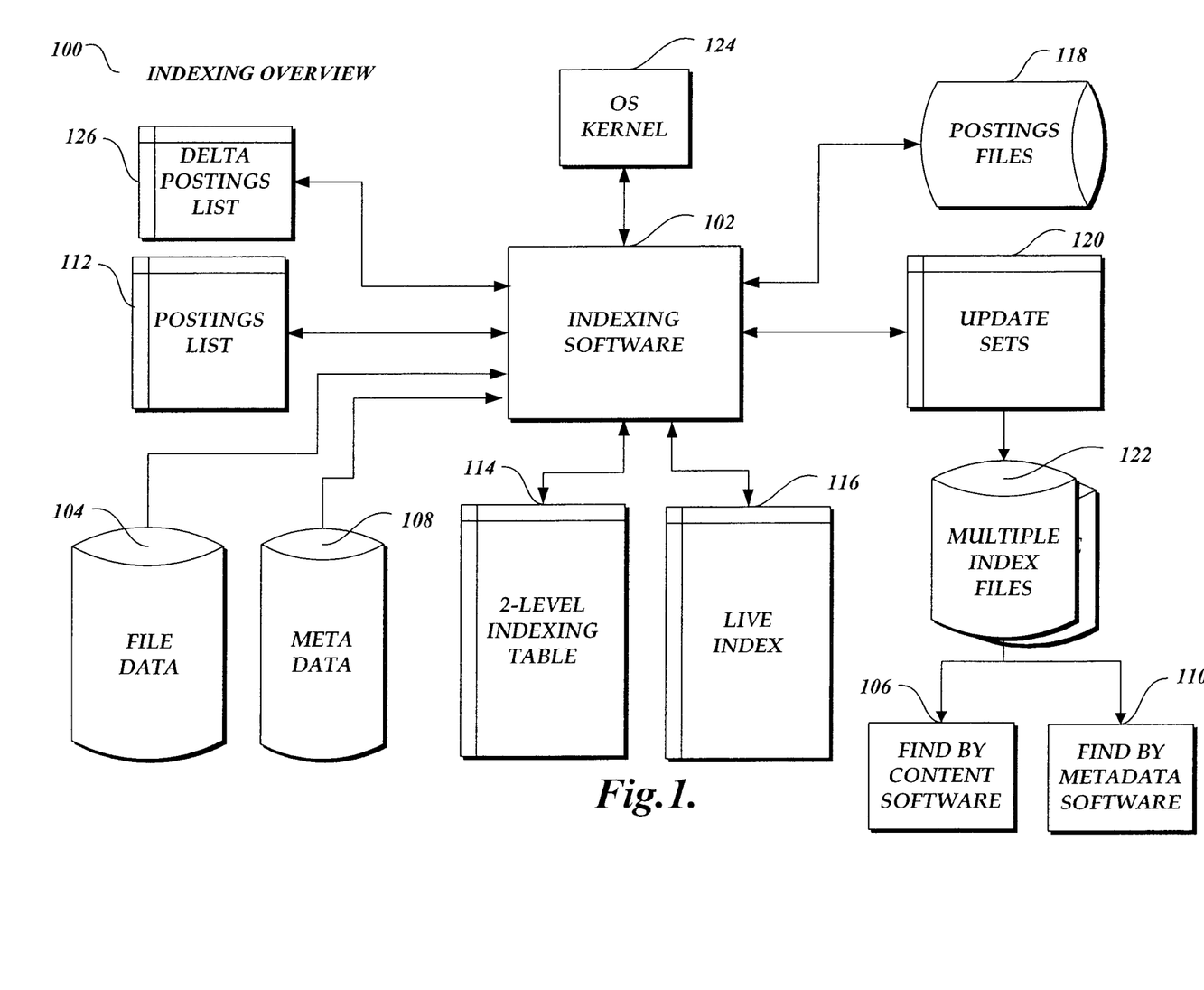
FIG. 1 is a block diagram overview of an architecture for processing an inverted index according to one exemplary embodiment of the invention.
Figure 4:
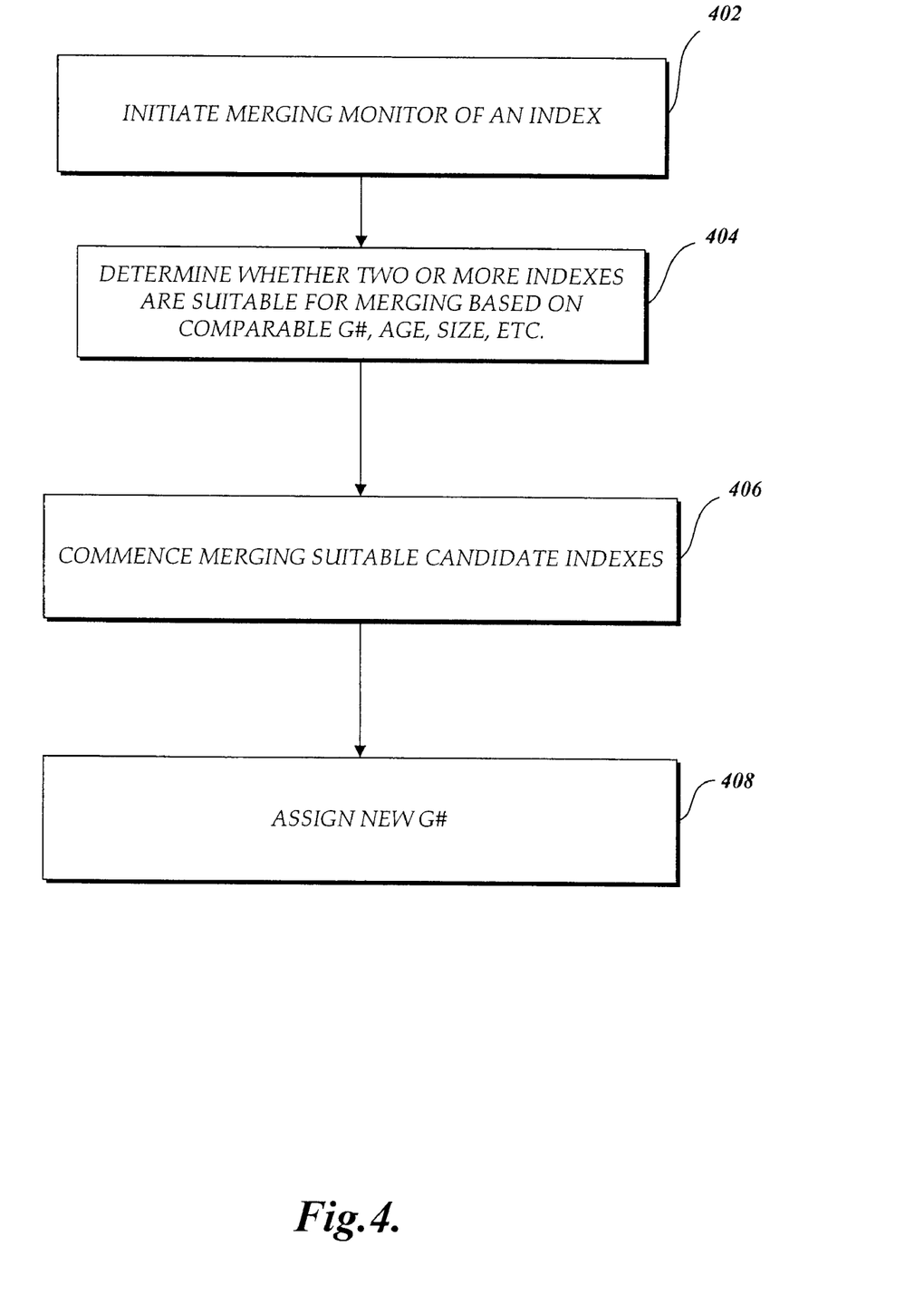
FIGS. 4-5 are flow diagrams illustrating certain aspects of performing a method of processing an index according to one exemplary embodiment of the invention.
Figure 5:
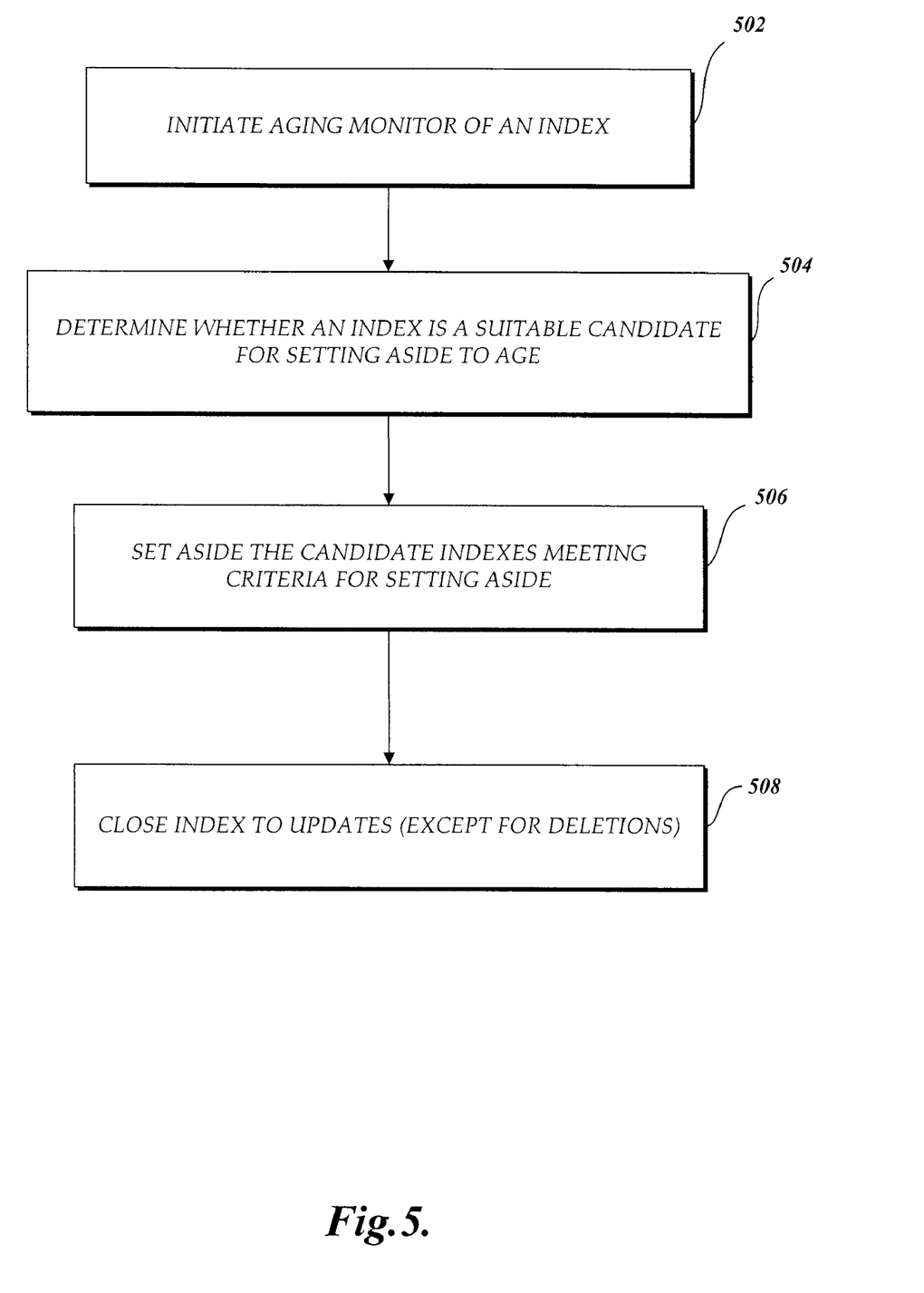

Various different software architectures may be used to implement the functions and operations described herein, such as to perform the method shown in FIGS. 4-5. The following discussion provides one example of such an architecture, but it will be understood that alternative architectures may also be employed to achieve the same or similar results. The software architecture 100 shown in FIG. 1 is an example which is based upon the Macintosh operating system. The architecture 100 includes indexing software 102 and an operating system (OS) kernel 124 which is operatively coupled to the indexing software 102, as well as other software programs, such as find by content software 106 and find by metadata software 110 (which may be the Finder program referenced earlier), and other applications not shown.

In one exemplary embodiment, the find by content software 106 and/or the find by metadata software 110 is used to find a term present in the file data 104 or meta data 108. For example, the software 106/110 may be used to find text and other information from word processing or text processing files created by word processing programs such as Microsoft Word, etc.

The find by content software 106 and find by metadata software 110 are operatively coupled to databases which include one or more indexes 122. The indexes 122 represent at least a subset of the data files in a storage device, including file data 104 and meta data 108, and may include all of the data files in a particular storage device (or several storage devices), such as the main hard drive of a computer system. The one or more indexes 122 comprise an indexed representation of the content and/or metadata of each item stored on the data files 104/108, such as a text document, music, video, or other type of file. The find by content software 106 searches for a term in that content by searching through the one or more index files 122 to see if the particular term, e.g., a particular word, is present in items stored on data files 104 which have been indexed. The find by content software functionality is available through find by metadata software 110 which provides the advantage to the user that the user can search the indexes 122 for the content 104 within an item stored on the data files 104 as well as any metadata 108 that may have been generated for the item.

In one embodiment of the present invention, indexing software 102 is used to create and maintain the one or more indexes 122 that are operatively coupled to the find by content and metadata software applications 106/110. Among other functions, the indexing software 102 receives information obtained by scanning the file data 104 and meta data 108, and uses that information to generate a postings list 112 that identifies an item containing a particular term, or having metadata containing a particular term. As such, the postings list 112 is a type of inverted index that maps a term, such as a search term, to the items identified in the list. In a typical embodiment, the information obtained during the scan includes a unique identifier that uniquely identifies the item containing the particular term, or having metadata containing the term. For example, items such as a word processing or text processing file have unique identifiers, referred to as ITEMIDs. The ITEMIDs are used when generating the postings list 112 to identify those items that contain a particular term, such as the word "Apple." ITEMIDs identifying other types of files, such as image files or music files, may also be posted to the postings list 112, in which case the ITEMID typically identifies items having metadata containing a particular term.

In one embodiment, the indexing software 102 accumulates postings lists 112 for one or more terms into one or more update sets 120 and, from time to time, flushes the updates sets 120 into one or more index files 122. The postings lists 112 for one or more items may also be stored in a postings file 118. The indexing software 102 may employ one or more indexing tables 114 that comprise one or more term tables, including a two-level table that separates the more frequently occurring terms from the less frequently occurring terms. The tables 114 may also include a postings table that comprises one or more postings lists for the terms that are being indexed. In one embodiment, the indexing software may maintain a live index 116 to contain the most current index. In some cases, updates to an index may be generated in a delta postings list 126 that is a specially marked postings list that may be dynamically applied to an index 122, postings files 118, updates sets 120, or other forms of an index in order to insure that the most current information is returned whenever those indexes are accessed.

Over time, an inverted index will grow to accommodate the indexing of new and updated data and metadata files. But the larger an index is, the longer it takes to update, and the less efficient it is to access during search and retrieval. So it is desirable to limit the growth of the index. But simply splitting up an index into smaller separate indexes is not a good solution since there is a certain amount of overhead for processing each index, and processing several small indexes may be less efficient than processing one index.

Embodiments of the present invention limit the growth of an index without simply splitting the index into several smaller indexes. As an inverted index grows, it is aged into multiple generational indexes stored on storage mediums to limit the growth of the index and improve the efficiency of accessing the index.

In one embodiment, two or more indexes meeting certain criteria are merged into one index. The merging criteria may include such things as the comparable age and size of each index. The merging criteria may be adapted to the current processing environment, such as the amount of memory that is available as well as processor speed and availability. Over time, merged indexes may be merged again with other merged indexes of comparable age and size resulting in multiple generations of indexes.

In one embodiment, indexes may be set aside to age when they meet certain criteria. The aging criteria may include such things as the age of the index, including the generation of the index as a result of merging, the allowable size of the index proportional to the amount of memory that is available, as well as the percentage of deletions from the index, and the amount of processor time needed to update the index. The criteria may be adapted to the current processing environment, such as the amount of memory that is available as well as processor speed and availability.

Since users tend to work on a few items at a time, the life cycle of a typical item represented in the index is such that an index referring to older items is less likely to need updating than an index referring to newer items. Therefore, in one embodiment, once an index is set aside, it is closed to updating, but may still be subject to deletions, and can still be accessed for search and retrieval. In addition, an index that has been set aside may be compacted into a format that is optimized for fast searching, whereas the newer, more active, indexes are maintained in a format that is better for updating and inserting.

Figure 2:
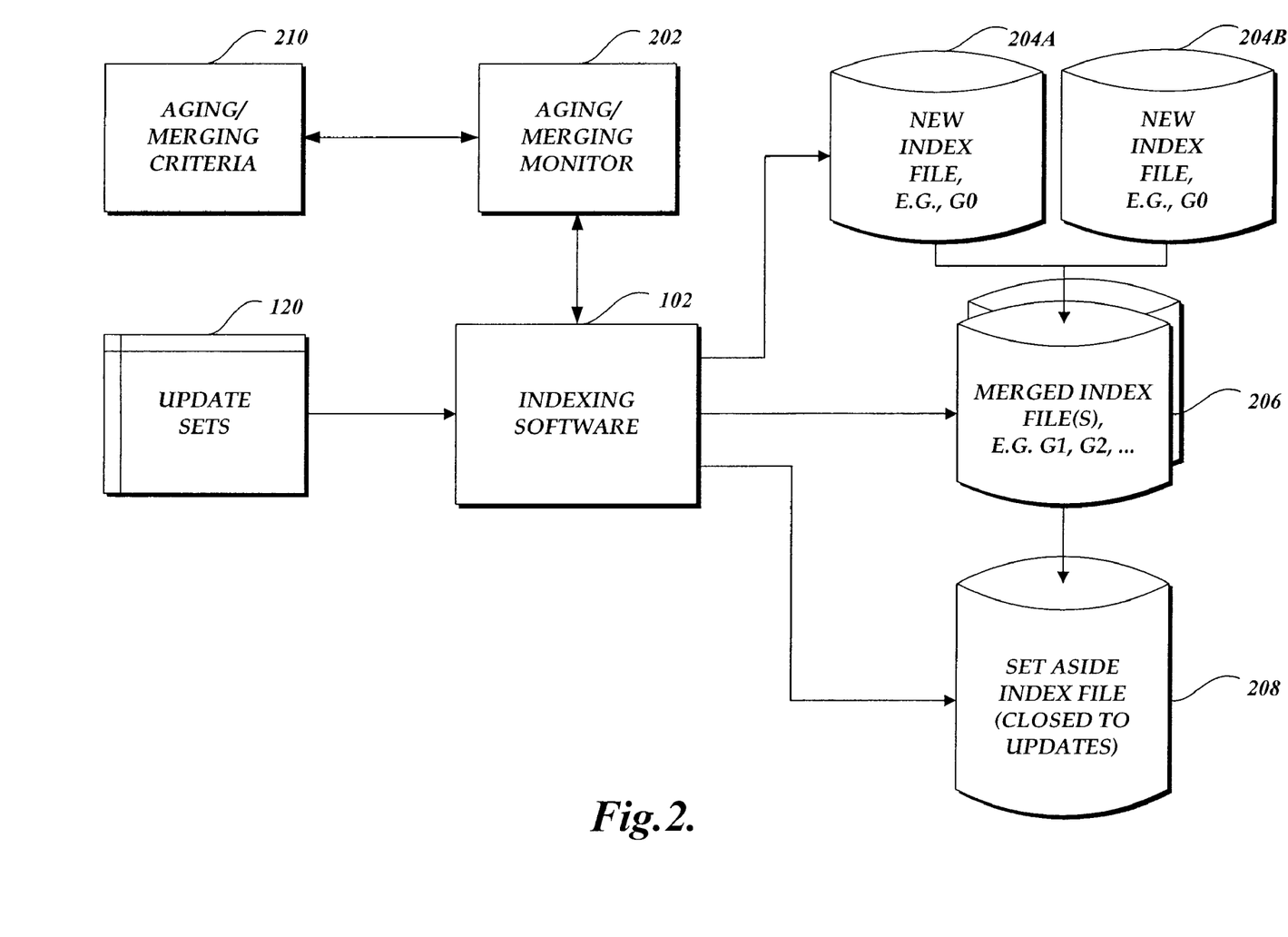
FIG. 2 is a block diagram illustrating one aspect of processing an index according to one exemplary embodiment of the invention.

FIG. 2 is a block diagram illustrating one aspect of processing an index according to one exemplary embodiment of the invention. An indexing software 102 is operatively coupled to update sets 120 comprising postings lists that are periodically flushed to new and/or merged index files 204A, 204B, 206. The indexing software 102 incorporates or is operatively coupled to an aging/merging monitor 202 that monitors various aspects about indexes to facilitate the indexing software's determination of when to merge and/or age an index. The aging/merging monitor 202 is operatively coupled to aging and merging criteria that indicate the conditions under which aging and merging an index is appropriate. In a typical embodiment, the monitor 202 obtains information about the characteristics of the index files 204A, 204B, 206 for which it is responsible such as the age, size, and amount of time required to flush the update sets 120 to an index, as well as information about the current indexing operating environment, such as the amount of memory that is available, and the processor speed and availability. All of the obtained information is analyzed in order to determine when to merge and age an index for optimal performance during updating, search, and retrieval.

In a typical embodiment, new index files 204A/204B are those that have not yet been merged, referred to as generation "0," or G0 indexes. Merged index files 206 are referred to with the number of times that they have been merged from younger indexes, such as G1, indicating once merged, G2 indicating twice merged, and so forth. A set aside index 208 is typically one that has already been subject to merging and has now met the criteria for being set aside. Once set aside, the index 208 is generally closed to further updates from update sets 120, but may continue to be subject to deletions.

With regard to merging, in one embodiment, those index files that are selected for merging are preferably ordered into a format that improves the efficiency of the merging process, which is itself a memory intensive computing operation. For example, prior to merging, the indexing software 102 may walk through the index and reorder the index using a process that is similar to the process used for flushing an update set 120 to an index. Once the indexes to be merged have been suitably ordered, the merging process may be performed in the background, leaving the indexes undergoing merging available for searching, and retrieval. In this manner, the merging process does not impact the user's access to the indexing information contained in indexes that are subject to merging.

Figure 3:
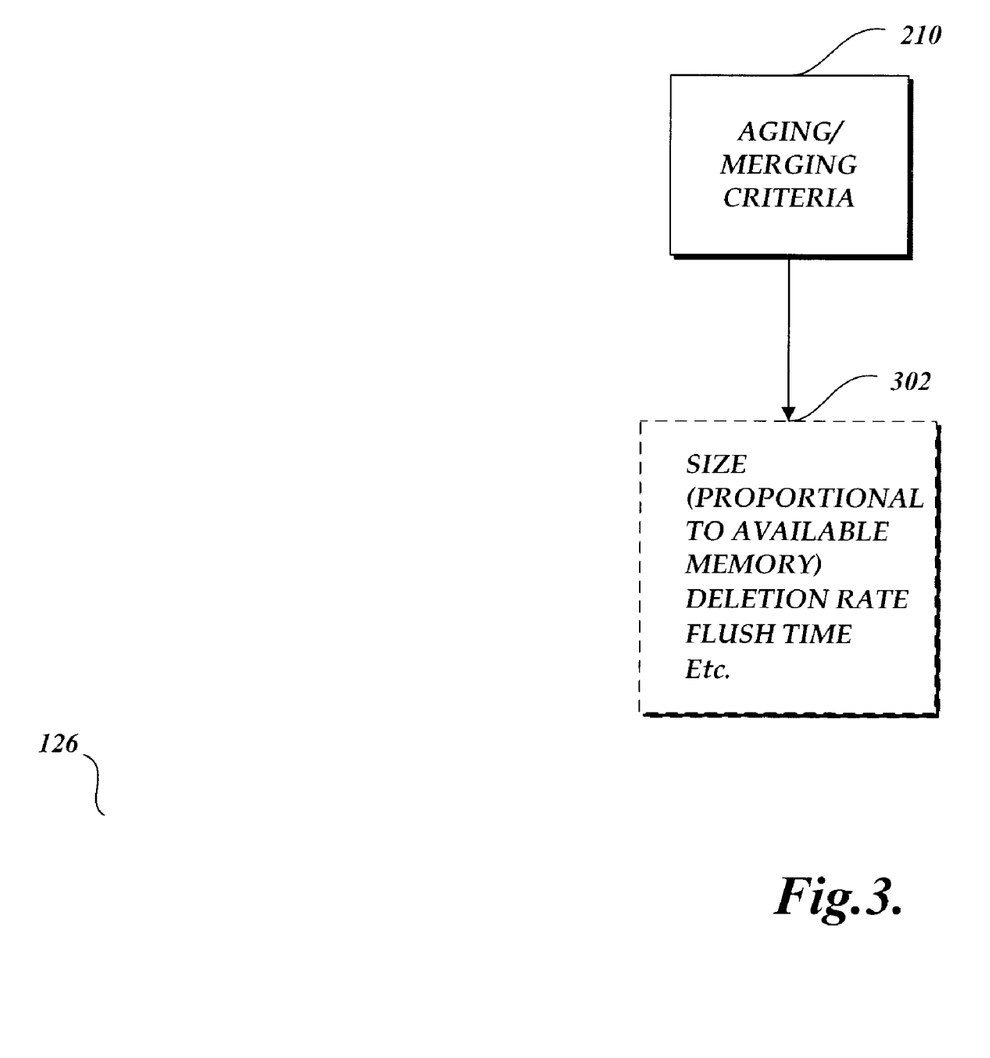
FIG. 3 is a block diagram illustrating another aspect of processing an index according to one exemplary embodiment of the invention.

FIG. 3 is a block diagram illustrating another aspect of processing an index according to one exemplary embodiment of the invention. As shown, the aging and merging criteria 210 may comprise a number of different criteria such as size, deletion rate, and flush time. The allowable or threshold size of an index before it is a candidate for aging or merging may be adapted to the current computing environment, such as the amount of memory that is currently available. The deletion rate refers to the number of items represented in the index that have been deleted, and is generally expressed as a percentage of deletions, such as 20 percent. An index with a high deletion rate is generally reflective of an older index, and is thus more likely to be set aside. The flush time refers to the amount of time that it takes to process an update set 120 to update an index. When an index grows, the update sets generally take longer to process. The threshold flush time before an index meets criteria for aging may be adapted to the current computing environment as well, such as the amount of memory available and the processor speed and availability.

FIGS. 4-5 are flow diagrams illustrating certain aspects of performing a method of processing an index according to one exemplary embodiment of the invention. FIG. 4 illustrates a generalized flow of performing a method of merging an index. At block 402, an indexing software initiates a merging monitor to obtain information about the index files for which it is responsible, as well as the current computing environment and the current merging criteria. At block 404, the indexing software determines whether two or more indexes are suitable for merging based on such criteria as the age, including the generation of the index as indicated by its G number, the size, flush time, deletion rate, etc. In a typical embodiment, those indexes that have a comparable size are generally the best candidates for merging.

At block 406, indexing software commences merging the candidate indexes. In one embodiment, the indexes are prepared for merging so that they are ordered into a format that will improve the efficiency of the merging process. In some cases, the indexes may be compacted or compressed into a format that will improve the efficiency of the merging process. The merging process is memory intensive, and is, therefore, typically conducted in the background, leaving the indexes available for access for searching and retrieval. At block 408, merging concludes, and the indexing software assigns an appropriate G number to the newly merged index to reflect the number of times that the index has been merged. The entire process may be repeated to merge previously merged indexes in the manner described.

FIG. 5 illustrates a generalized flow of performing a method of aging an index. At block 502, an indexing software initiates an aging monitor to obtain information about the index files for which it is responsible, as well as the current computing environment and the current aging criteria. At block 504, the indexing software determines whether an index file is a suitable candidate for being set aside to age, based on such criteria as the age, including the generation of the index as indicated by its G number, the size, flush time, deletion rate, etc. At block 506, indexing software sets aside an index that has met the criteria for being set aside, including at block 508, closing the index to future updates with the exception of deletions.

Figure 6:
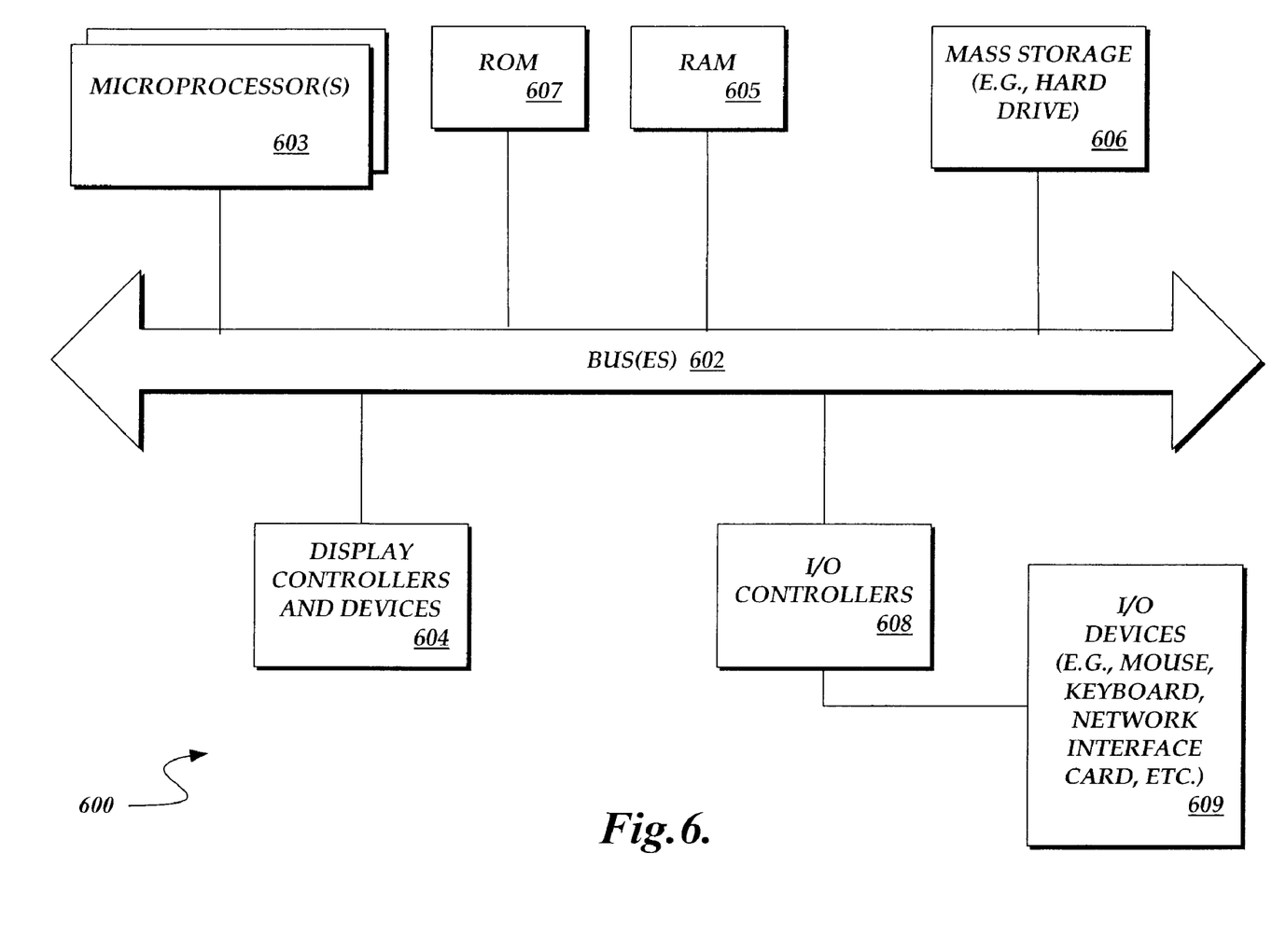
FIG. 6 is a block diagram overview of an exemplary embodiment of a data processing system, which may be a general purpose computer system and which may operate in any of the various methods described herein.

FIG. 6 illustrates an example of a typical computer system which may be used with the present invention. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 6 may, for example, be a Macintosh computer from Apple Computer, Inc.

As shown in FIG. 6, the computer system 601, which is a form of a data processing system, includes a bus 602 which is coupled to a microprocessor(s) 603 and a ROM (Read Only Memory) 607 and volatile RAM 605 and a non-volatile memory 606. The microprocessor 603 may be a G3 or G4 microprocessor from Motorola, Inc. or one or more G5 microprocessors from IBM. The bus 602 interconnects these various components together and also interconnects these components 603, 607, 605, and 606 to a display controller and display device 604 and to peripheral devices such as input/output (I/O) devices which may be mice, keyboards, modems, network interfaces, printers and other devices which are well known in the art. Typically, the input/output devices 609 are coupled to the system through input/output controllers 608. The volatile RAM (Random Access Memory) 605 is typically implemented as dynamic RAM (DRAM) which requires power continually in order to refresh or maintain the data in the memory. The mass storage 606 is typically a magnetic hard drive or a magnetic optical drive or an optical drive or a DVD RAM or other types of memory systems which maintain data (e.g. large amounts of data) even after power is removed from the system. Typically, the mass storage 606 will also be a random access memory although this is not required. While FIG. 6 shows that the mass storage 606 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers and/or adapters as is well known in the art. In one embodiment the I/O controller 608 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 607, RAM 605, mass storage 606 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 603.

What is claimed is:

1. A machine-implemented method of maintaining an inverted index, the method comprising:
   receiving merging criteria for merging multiple indexes of an inverted index into a next generation index;
   receiving aging criteria for aging indexes of the inverted index;
   monitoring a characteristic of an index of the inverted index for determining when the index meets the merging criteria;
   merging the index that meets the merging criteria with one or more indexes that meet the criteria and are determined to be suitable for merging, wherein indexes determined to be suitable for merging have comparable characteristics;
   setting the merged indexes aside to age when the characteristics of the merged indexes meet the aging criteria.

2. The method of claim 1, wherein setting the merged index aside to age includes closing the merged index to updating except for deleting.

3. A computer readable storage medium storing executable instructions which when executed by a data processing system cause the data processing system to perform a method as in claim 2.

4. The method of claim 1, wherein the aging criteria includes at least one of a size of the index, an age of the index, how much of the index has been deleted, and how long it takes to update the index.

5. A computer readable storage medium storing executable instructions which when executed by a data processing system cause the data processing system to perform a method as in claim 4.

6. The method of claim 1, further comprising:
   monitoring a current computing environment in which the inverted index is maintained;
   adapting the merging criteria and aging criteria to the current computing environment; and
   merging and setting the merged indexes aside to age when the characteristics of the merged indexes meet the merging criteria and aging criteria as adapted to the current computing environment.

7. A computer readable storage medium storing executable instructions which when executed by a data processing system cause the data processing system to perform a method as in claim 6.

8. The method of claim 6, wherein the current computing environment includes an amount of memory available to maintain the inverted index and a speed and availability of a processor in which to maintain the inverted index.

9. A computer readable storage medium storing executable instructions which when executed by a data processing system cause the data processing system to perform a method as in claim 8.

10. A computer readable storage medium storing executable instructions which when executed by a data processing system cause the data processing system to perform a method as in claim 1.

* * * * *